US010846079B2

(12) United States Patent
Olderdissen et al.

(10) Patent No.: US 10,846,079 B2
(45) Date of Patent: Nov. 24, 2020

(54) SYSTEM AND METHOD FOR THE DYNAMIC EXPANSION OF A CLUSTER WITH CO NODES BEFORE UPGRADE

(71) Applicant: Nutanix, Inc., San Jose, CA (US)

(72) Inventors: Jan Olderdissen, Herrenberg (DE); Aroosh Sohi, Los Gatos, CA (US)

(73) Assignee: NUTANIX, INC., San Jose, CA (US)

( * ) Notice: Subject to any disclaimer, the term of this patent is extended or adjusted under 35 U.S.C. 154(b) by 122 days.

(21) Appl. No.: 16/191,377

(22) Filed: Nov. 14, 2018

(65) Prior Publication Data

US 2020/0150946 A1   May 14, 2020

(51) Int. Cl.
| | |
|---|---|
| *G06F 8/65* | (2018.01) |
| *G06F 9/455* | (2018.01) |
| *G06F 11/14* | (2006.01) |
| *G06F 11/07* | (2006.01) |
| *G06F 11/20* | (2006.01) |
| *G06F 11/34* | (2006.01) |
| *G06F 11/30* | (2006.01) |

(52) U.S. Cl.
CPC ............... *G06F 8/65* (2013.01); *G06F 11/07* (2013.01); *G06F 11/1484* (2013.01); *G06F 11/203* (2013.01); *G06F 11/2035* (2013.01); *G06F 11/2048* (2013.01); *G06F 11/3442* (2013.01); *G06F 9/45558* (2013.01); *G06F 11/301* (2013.01); *G06F 11/3006* (2013.01); *G06F 2009/45595* (2013.01)

(58) Field of Classification Search
CPC ............ G06F 8/60–66; G06F 9/45558; G06F 9/50–5083; G06F 11/07; G06F 11/1484; G06F 11/202–2051; G06F 11/3006; G06F 11/301; G06F 11/3442
See application file for complete search history.

(56) References Cited

U.S. PATENT DOCUMENTS

| | | | |
|---|---|---|---|
| 6,115,830 A | 9/2000 | Zabarsky et al. | |
| 8,195,976 B2 | 6/2012 | Rao et al. | |
| 8,549,518 B1 | 10/2013 | Aron et al. | |
| (Continued) | | | |

OTHER PUBLICATIONS

Epping, D., "Scale Up/Out and Impact of vRAM?!? (part 2)", Yellow-Bricks.com [online], 2011 [retrieved May 9, 2020], Retrieved from Internet: <URL: http://www.yellow-bricks.com/2011/07/21/scale-upout-and-impact-of-vram-part-2/>, pp. 1-6.*

(Continued)

*Primary Examiner* — Todd Aguilera
(74) *Attorney, Agent, or Firm* — Foley & Lardner LLP

(57) ABSTRACT

Systems and method for expanding a cluster with nodes before an upgrade so that the cluster can handle a failover event during an upgrade and still continue operating. The system and method includes receiving, at a processor, a signal indicating a cluster is about to commence an upgrade; computing, by the processor, a first number of nodes; adding, by the processor, the first number of nodes from a network to the cluster before the upgrade is performed on the cluster; receiving, at the processor, a signal indicating the cluster finished the upgrade; and removing a second number of nodes that is no greater than the first number of nodes from the cluster after the processor receives the signal indicating the upgrade is complete.

20 Claims, 8 Drawing Sheets

(56) References Cited

U.S. PATENT DOCUMENTS

| | | | | |
|---|---|---|---|---|
| 8,572,138 | B2* | 10/2013 | Sundar | G06F 8/60 |
| | | | | 707/828 |
| 8,601,473 | B1 | 12/2013 | Aron et al. | |
| 8,850,130 | B1 | 9/2014 | Aron et al. | |
| 9,176,829 | B2 | 11/2015 | Jain et al. | |
| 9,747,176 | B2 | 8/2017 | Oppermann | |
| 9,772,866 | B1 | 9/2017 | Aron et al. | |
| 9,836,234 | B2* | 12/2017 | Colgrove | G06F 11/1068 |
| 9,848,041 | B2* | 12/2017 | Einkauf | G06F 9/5077 |
| 10,002,058 | B1* | 6/2018 | Shanmugam | G06F 11/2038 |
| 10,346,252 | B1 | 7/2019 | Gould et al. | |
| 10,372,565 | B2 | 8/2019 | Peng et al. | |
| 2006/0130042 | A1* | 6/2006 | Dias | G06F 9/5083 |
| | | | | 717/168 |
| 2007/0233698 | A1* | 10/2007 | Sundar | G06F 11/2025 |
| 2010/0250824 | A1 | 9/2010 | Belay | |
| 2015/0089504 | A1 | 3/2015 | Hartman et al. | |
| 2016/0179635 | A1 | 6/2016 | Kondalsamy et al. | |
| 2016/0204977 | A1 | 7/2016 | Cui et al. | |
| 2016/0246528 | A1* | 8/2016 | Colgrove | G06F 11/108 |
| 2016/0323377 | A1* | 11/2016 | Einkauf | G06F 9/5083 |
| 2016/0378622 | A1 | 12/2016 | Ren et al. | |
| 2018/0165166 | A1 | 6/2018 | Wang et al. | |
| 2018/0302340 | A1* | 10/2018 | Alvarez Callau | H04L 47/76 |
| 2019/0235978 | A1 | 8/2019 | Wu et al. | |
| 2019/0317869 | A1* | 10/2019 | Selvaraj | G06F 11/203 |
| 2019/0324874 | A1 | 10/2019 | Gill et al. | |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jan. 12, 2016), from https://nutanixbible.com/.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jun. 25, 2018), from https://nutanixbible.com/.

Poitras, Steven. "The Nutanix Bible" (Jan. 3, 2017), from https://nutanixbible.com/.

Poitras, Steven. "The Nutanix Bible" (Jan. 3, 2018), from https://nutanixbible.com/.

Poitras, Steven. "The Nutanix Bible" (Sep. 4, 2015), from https://nutanixbible.com/.

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 8, 2017), from https://nutanixbible.com/.

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Jun. 9, 2016), from https://nutanixbible.com/.

Cano, Ignacio, et al. "Curator: Self-Managing Storage for Enterprise Clusters" (Mar. 27, 2017), from https://www.usenix.org/conference/nsdi17/.

United States Army Research Laboratory, "Dynamically Allocated Virtual Clustering Management System (DAVC)" https://www.arl.army.mil/www/default.cfm?page=2488 [retrieved Oct. 17, 2017], Retrieved from Internet Archive [https://web.archive.org/web/20171017023707/https://www.arl.army.mil/www/default.cfm?page=2488] dated Jun. 5, 2020.

* cited by examiner

SYSTEM AND METHOD FOR THE DYNAMIC EXPANSION OF A CLUSTER WITH CO NODES BEFORE UPGRADE

BACKGROUND

The following description is provided to assist the understanding of the reader. None of the information provided or references cited is admitted to be prior art.

Virtual computing systems are widely used in a variety of applications. Virtual computing systems include one or more host machines running one or more virtual machines concurrently. Host machines may be combined to form a cluster including the virtual machines of each host machine. The virtual machines utilize the hardware resources of the underlying host machines. Each virtual machine may be configured to run an instance of an operating system. Modern virtual computing systems allow several operating systems and several software applications to be safely run at the same time on the virtual machines of a single host machine, thereby increasing resource utilization and performance efficiency. However, the present day virtual computing systems have limitations due to their configuration and the way they operate.

SUMMARY

In accordance with at least some aspects of the present disclosure, a method is disclosed. The method includes a tenant resource processor receiving a signal indicating a cluster is about to commence an upgrade. The method also includes the tenant resource processor computing a first number of nodes, adding the first number of nodes from a network to the cluster before the upgrade is commenced on the cluster, receiving a signal indicating the cluster finished the upgrade, and removing a second number of nodes that is no greater than the first number of nodes from the cluster after receiving a signal that the upgrade is complete.

In accordance with some aspects of the present disclosure, an expansion system is disclosed. The expansion system comprises a tenant resource processor configured to receive a signal indicating a cluster is about to commence an upgrade, compute a first number of nodes, add the first number of nodes from a network to the cluster before the upgrade is commenced on the cluster, receive a signal indicating the cluster finished the upgrade, and remove a second number of nodes that is no greater than the first number of nodes from the cluster.

In accordance with some aspects of the present disclosure, a non-transitory computer readable media including computer-executable instructions is disclosed. The instructions, when executed by a processor of an expansion system, cause the expansion system to perform a process, comprising: receiving a signal indicating a cluster is about to commence an upgrade, computing a first number of nodes, adding the first number of nodes from a network to the cluster before the upgrade is commenced on the cluster, receiving a signal that the cluster finished the upgrade, and removing any number of nodes from the cluster.

The foregoing summary is illustrative only and is not intended to be in any way limiting. In addition to the illustrative aspects, implementations, and features described above, further aspects, implementations, and features will become apparent by reference to the following drawings and the detailed description.

Figure 1:
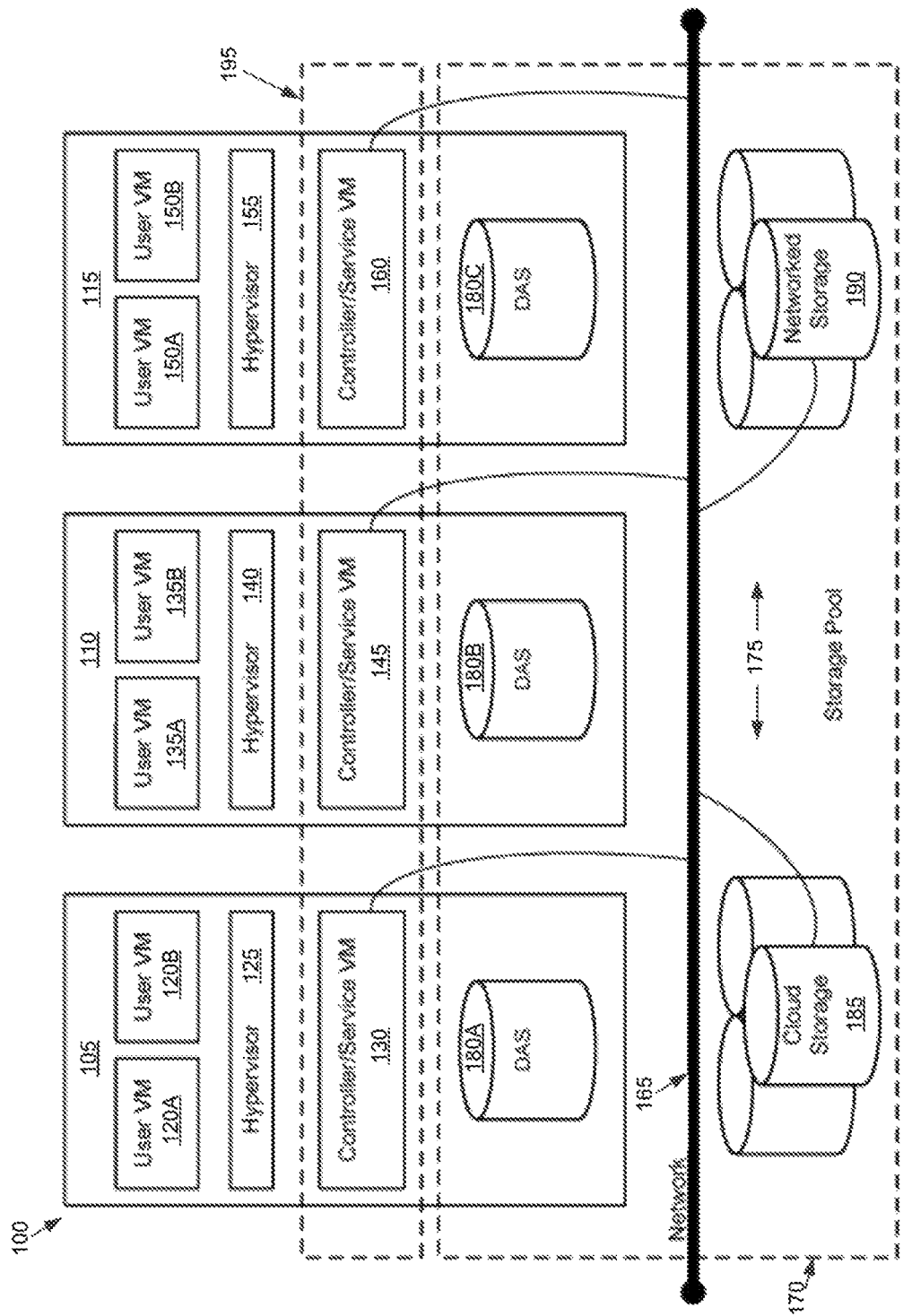
FIG. 1 is a block diagram of a virtual computing system, in accordance with some embodiments of the present disclosure.

The foregoing and other features of the present disclosure will become apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure is directed to a virtual computing system including one or a plurality of clusters, with each of the clusters including one or more host machines (also referred to herein as "nodes"). Each of the one or more host machines include one or more virtual machines running thereon, with each of the one or more virtual machines running one or more applications. Further, in some embodiments, the virtual computing system may be organized into client sites and a disaster recovery site. Each of the client sites and the disaster recovery site include a plurality of clusters, host machines, and virtual machines, as discussed above.

In some embodiments, the disaster recovery site is managed by a site operator. The client sites may enter into a Service Level Agreement ("SLA") with the site operator for using the disaster recovery site. The disaster recovery site is a highly engineered and reliable virtual computing system that provides data recovery and data backup facilities to the client sites in accordance with the SLA, and maintains a continuity of operation of the client sites in the aftermath of a disaster condition. A disaster condition may include planned outages, performance related failures, component failures, power failures, natural calamities, or any other condition that hampers the normal operation of the clusters at the client sites. Generally speaking and as used herein, a disaster condition is any condition that causes hardware failure or otherwise prevents a hardware component from operating as intended. For example, a condition that causes a malfunction of any cluster at a client site or that significantly hampers the normal operation of any clusters is referred to as a disaster condition.

When a disaster condition is detected, impacted virtual machines in clusters within the client sites are migrated to the disaster recovery sites for operation until the disaster condition is resolved. Migration of the clusters from the client sites to the disaster recovery site greatly reduces the downtime of the client sites due to the disaster condition and maintains a substantial continuity of operation of the client sites. Upon the resolution of the disaster condition, the clusters are migrated back to the client sites and resume operation from the client sites.

Conventionally, the disaster recovery site is used only for managing the disaster conditions. When no disaster conditions are detected, the disaster recovery site sits in a cold-standby state, waiting for a disaster condition to strike. In the cold-standby state, clusters within the client site continuously push information to clusters in the disaster recovery site. The information is integrated into shadow disk images kept in the clusters in the disaster recovery site. Nonetheless, since the client sites rely on the disaster recovery site for continuity of operation, the disaster recovery site needs to be constantly maintained and in an operable condition at all times. There are times when a cluster in the disaster recovery site needs to undergo an upgrade, whether it is an upgrade to improve cluster capacity, the operating systems of the hardware within the cluster, communication between the hardware on the clusters, or a maintenance upgrade to smooth out any bugs. If a disaster condition strikes when the cluster in the disaster recovery site is upgrading, the cluster experiencing the disaster condition may still migrate its data to the upgrading cluster at the disaster recovery site. Unfortunately, if the upgrading cluster in the disaster recovery site does not have enough resources, such as CPU cores and memory, to handle the migrating clusters, it is difficult to add additional nodes to the cluster during the upgrade because upgrades are complex and liable to cause issues within the system if not performed perfectly. Adding and removing nodes during the upgrade increases the chance that the upgrade causes an error. Currently, to ensure upgrades go smoothly at a cluster during an upgrade, the node configuration of the upgrading cluster freezes, making it impossible to add or subtract nodes from the cluster. Freezing the node configuration within the cluster is effective unless user VMs within a cluster in the client site with a significant amount of resources experiences a failover event and needs to migrate its data to the upgrading cluster. The user VMs may only be able to migrate data to the upgrading cluster because the user VMs have already designated the upgrading cluster as the cluster they will migrate to during a failover event. Often, the upgrading cluster does not have the CPU cores or memory to handle such a migration, so it needs to add new nodes to handle the migration. During an upgrade, the node configuration is frozen, so the cluster cannot expand, leaving the data from the cluster experiencing the disaster condition unable to migrate to the new cluster and users at the cluster unable to continue operating their devices. Currently, customers may have two data centers, a primary data center and a fallback data center. The fallback data centers always have enough resources to handle a migration of user VMs experiencing a failover event in the primary data center, even when a cluster in the fallback data center is upgrading. Providing these resources can be expensive and require a lot of computing power, so there is a need to provide a disaster recovery site that replaces the fallback center that requires less resources and can still handle a failover event at the client site in any situation, including when a cluster in the disaster recovery site is upgrading.

The present disclosure provides a method of ensuring a cluster in a disaster recovery site has enough CPU cores and memory to handle a disaster condition at a client site while a cluster in the disaster recovery site is upgrading. For example, the present disclosure provides a method of adding additional nodes, with or without storage, to the cluster in the disaster recovery site before the cluster undergoes an upgrade, and then removing nodes from the cluster after the upgrade. The method involves calculating the most resources the cluster will need to handle in a disaster condition, adding nodes to the cluster so the cluster has enough resources, performing the upgrade, and then removing nodes that are not operating from the cluster. The method improves the cluster upgrade process and allows clusters within the disaster recovery site to be able to handle a disaster condition at a client site when the cluster is upgrading.

The present disclosure provides a compute only node which can easily be removed from the cluster. Compute only nodes do not have data storage, but instead only have memory and CPU cores to handle extra computing needs at the cluster. Because compute only nodes do not have any data storage, when they are added to a cluster, no information can be written into the compute only nodes. The benefit of the lack of data storage comes when the cluster needs to remove unused nodes from the cluster after an upgrade. Because compute only nodes do not have anything written into storage, compute only nodes do not need to erase any information before leaving the cluster. If compute only nodes had storage, data would be written onto that storage when the compute only node joins the cluster. In this scenario, once the data is written on to the compute only node, the data must be removed before the compute only node can be removed from the cluster. Removing the data takes hours, so including nodes that cannot include any written data speeds up the node removal process. Speeding up the node removal process allows clients to test their disaster recovery system much more frequently by reducing the length of time of each test. Without needing to wait hours for nodes to remove data written into storage in each test, clients running the test can save hours each test and run the tests more frequently each day.

Virtual Computing System

Referring now to FIG. 1, a virtual computing system 100 is shown, in accordance with some embodiments of the present disclosure. Virtual computing system 100 includes a plurality of nodes, such as a first node 105, a second node 110, and a third node 115. Each of first node 105, second node 110, and third node 115 may also be referred to as a "host" or "host machine." First node 105 includes user virtual machines ("user VMs") 120A and 120B (collectively referred to herein as "user VMs 120"), a hypervisor 125 configured to create and run the user VMs, and a controller/ service VM 130 configured to manage, route, and otherwise handle workflow requests between the various nodes of virtual computing system 100. Similarly, second node 110 includes user VMs 135A and 135B (collectively referred to herein as "user VMs 135"), a hypervisor 140, and a controller/service VM 145, and third node 115 includes user VMs 150A and 150B (collectively referred to herein as "user VMs 150"), a hypervisor 155, and a controller/service VM 160. Controller/service VM 130, controller/service VM 145, and controller/service VM 160 are all connected to a network 165 to facilitate communication between first node 105, second node 110, and third node 115. Although not shown, in some embodiments, hypervisor 125, hypervisor 140, and hypervisor 155 may also be connected to network 165.

Virtual computing system 100 also includes a storage pool 170. Storage pool 170 may include network-attached storage 175 and direct-attached storage 180A, 180B, and 180C. Network-attached storage 175 is accessible via network 165 and, in some embodiments, may include cloud storage 185, as well as local storage area network 190. In contrast to the network-attached storage 175, which is accessible via network 165, direct-attached storage 180A, 180B, and 180C includes storage components that are provided within each of first node 105, second node 110, and third node 115, respectively, such that each of the first, second, and third nodes may access its respective direct-attached storage without having to access network 165.

It is to be understood that only certain components of virtual computing system 100 are shown in FIG. 1. Nevertheless, several other components that are needed or desired in virtual computing system 100 to perform the functions described herein are contemplated and considered within the scope of the present disclosure. Further, although three of the plurality of nodes (e.g., the first node 105, the second node 110, and the third node 115) are shown in virtual computing system 100, in other embodiments, greater than or fewer than three nodes may be used. Likewise, although only two of the user VMs (e.g., user VMs 120, user VMs 135, and user VMs 150) are shown on each of respective first node 105, second node 110, and third node 115, in other embodiments, the number of the user VMs on each of the first, second, and third nodes may vary to include either a single user VM or more than two user VMs. Further, first node 105, second node 110, and third node 115 need not always have the same number of the user VMs (e.g., user VMs 120, 135, 150).

In some embodiments, each of first node 105, second node 110, and third node 115 may be a hardware device, such as a server. For example, in some embodiments, one or more of first node 105, second node 110, and third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of first node 105, second node 110, or third node 115 may be another type of hardware device, such as a personal computer, an input/output or peripheral unit such as a printer, or any type of device that is suitable for use as a node within virtual computing system 100.

Each of first node 105, second node 110, and third node 115 may also be configured to communicate and share resources with each other via network 165. For example, in some embodiments, first node 105, second node 110, and third node 115 may communicate and share resources with each other via controller/service VM 130, controller/service VM 145, and controller/service VM 160, and/or hypervisor 125, hypervisor 140, and hypervisor 155. One or more of first node 105, second node 110, and third node 115 may be organized in a variety of network topologies.

Also, although not shown, one or more of first node 105, second node 110, and third node 115 may include one or more processing units configured to execute instructions. The instructions may be carried out by a special purpose computer, logic circuits, or hardware circuits of the first node 105, second node 110, and third node 115. The processing units may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units, thus, execute an instruction, meaning that they perform the operations called for by that instruction.

The processing units may be operably coupled to storage pool 170, as well as with other elements of first node 105, second node 110, and third node 115 to receive, send, and process information, and to control the operations of the underlying first, second, or third node. The processing units may retrieve a set of instructions from storage pool 170, such as, from a permanent memory device like a read only memory ("ROM") device and copy the instructions in an executable form to a temporary memory device that is generally some form of random access memory ("RAM"). The ROM and RAM may both be part of storage pool 170, or in some embodiments, may be separately provisioned from the storage pool. Further, the processing units may include a single stand-alone processing unit, or a plurality of processing units that use the same or different processing technology.

With respect to the storage pool 170 and particularly with respect to direct-attached storage 180A, 180B, and 180C, each of the direct-attached storage may include a variety of types of memory devices. For example, in some embodiments, one or more of the direct-attached storage 180A, 180B, and 180C may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, network-attached storage 175 may include any of a variety of network accessible storage (e.g., cloud storage 185, local storage area network 190, etc.) that is suitable for use within virtual computing system 100 and accessible via network 165. Storage pool 170, including network-attached storage 175 and direct-attached storage 180A, 180B, and 180C, together form a distributed storage system configured to be accessed by each of first node 105, second node 110, and third node 115 via network 165, controller/service VM 130, controller/service VM 145, controller/service VM 160, and/or hypervisor 125, hypervisor 140, and hypervisor 155. In some embodiments, the various storage components in the storage pool 170 may be configured as virtual disks for access by user VMs 120, 135, 150.

Each of user VMs 120, 135, 150 is a software-based implementation of a computing machine in the virtual computing system 100. User VMs 120, 135, 150 emulate the functionality of a physical computer. Specifically, the hardware resources, such as processing unit, memory, storage, etc., of the underlying computer (e.g., first node 105, second node 110, and third node 115) are virtualized or transformed by respective hypervisor 125, hypervisor 140, and hypervisor 155, into the underlying support for each of user VMs 120, user VMs 135, and user VMs 150 that may run its own operating system and applications on the underlying physical resources just like a real computer. By encapsulating an entire machine, including CPU, memory, operating system, storage devices, and network devices, user VMs 120, user VMs 135, and user VMs 150 are compatible with most standard operating systems (e.g. Windows, Linux, etc.), applications, and device drivers. Thus, each of hypervisor 125, hypervisor 140, and hypervisor 155 is a virtual machine monitor that allows a single physical server computer (e.g., first node 105, second node 110, third node 115) to run multiple instances of user VMs 120, user VMs 135, and user VMs 150, with each user VM sharing the resources of that one physical server computer, potentially across multiple environments. By running user VMs 120, user VMs 135, and user VMs 150 on each of first node 105, second node 110, and third node 115, respectively, multiple workloads and multiple operating systems may be run on a single piece of underlying hardware computer (e.g., the first node, the second node, and the third node) to increase resource utilization and manage workflow.

User VMs 120, 135, 150 are controlled and managed by their respective instance of controller/service VM 130, controller/service VM 145, and controller/service VM 160. Controller/service VM 130, controller/service VM 145, and controller/service VM 160 are configured to communicate with each other via the network 165 to form a distributed system 195. Each of controller/service VM 130, controller/service VM 145, and controller/service VM 160 may also include a local management system (e.g., Prism Element from Nutanix, Inc.) configured to manage various tasks and operations within the virtual computing system 100. For example, in some embodiments, the local management system may perform various management related tasks on user VMs 120, 135, 150. Additionally, in some embodiments, although not shown, virtual computing system 100 includes a central management system (e.g., Prism Central from Nutanix, Inc.) that is configured to manage and control the operation of various clusters in the virtual computing system. In some embodiments, the central management system may be configured to communicate with the local management systems on each of controller/service VM 130, controller/service VM 145, controller/service VM 160 for controlling the various clusters.

Hypervisor 125, hypervisor 140, and hypervisor 155 of first node 105, second node 110, and third node 115, respectively, may be configured to run virtualization software, such as, ESXi from VMWare, AHV from Nutanix, Inc., XenServer from Citrix Systems, Inc., etc. The virtualization software on hypervisor 125, hypervisor 140, and hypervisor 155 may be configured for running user VMs 120, 135, 150, respectively, and for managing the interactions between those user VMs and the underlying hardware of first node 105, second node 110, and third node 115. Each of controller/service VM 130, controller/service VM 145, controller/service VM 160, hypervisor 125, hypervisor 140, and hypervisor 155 may be configured as suitable for use within virtual computing system 100.

Network 165 may include any of a variety of wired or wireless network channels that may be suitable for use within virtual computing system 100. For example, in some embodiments, network 165 may include wired connections, such as an Ethernet connection, one or more twisted pair wires, coaxial cables, fiber optic cables, etc. In other embodiments, network 165 may include wireless connections, such as microwaves, infrared waves, radio waves, spread spectrum technologies, satellites, etc. Network 165 may also be configured to communicate with another device using cellular networks, local area networks, wide area networks, the Internet, etc. In some embodiments, network 165 may include a combination of wired and wireless communications.

Referring still to FIG. 1, in some embodiments, one of first node 105, second node 110, or third node 115 may be configured as a leader node. The leader node may be configured to monitor and handle requests from other nodes in virtual computing system 100. For example, a particular user VM (e.g., user VMs 120, 135, 150) may direct an input/output request to the controller/service VM (e.g., controller/service VM 130, controller/service VM 145, or controller/service VM 160, respectively) on the underlying node (e.g., first node 105, second node 110, or third node 115, respectively). Upon receiving the input/output request, that controller/service VM may direct the input/output request to the controller/service VM (e.g., one of controller/service VM 130, controller/service VM 145, or controller/service VM 160) of the leader node. In some cases, the controller/service VM that receives the input/output request may itself be on the leader node, in which case, the controller/service VM does not transfer the request, but rather handles the request itself. In some embodiments, each of nodes 105, 110, and 115 may be configured to be leader nodes at the same time, in these embodiments, each leader node may handle different requests.

The controller/service VM of the leader node may fulfil the input/output request (and/or request another component within virtual computing system 100 to fulfil that request). Upon fulfilling the input/output request, the controller/service VM of the leader node may send a response back to the controller/service VM of the node from which the request was received, which in turn may pass the response to the user VM that initiated the request. In a similar manner, the leader node may also be configured to receive and handle requests (e.g., user requests) from outside of virtual computing system 100. If the leader node fails, another leader node may be designated.

Furthermore, one or more of first node 105, second node 110, and third node 115 may be combined together to form a network cluster (also referred to herein as simply "cluster.") Generally speaking, all of the nodes (e.g., first node 105, second node 110, and third node 115) in virtual computing system 100 may be divided into one or more clusters. One or more components of storage pool 170 may be part of the cluster as well. For example, virtual computing system 100 as shown in FIG. 1 may form one cluster in some embodiments. Multiple clusters may exist within a given virtual computing system (e.g., virtual computing system 100). User VMs 120, 135, 150 that are part of a cluster are configured to share resources with each other. In some embodiments, multiple clusters may share resources with one another. Additionally and as explained in greater detail below, virtual computing system 100 may be part of a data center, a disaster recovery site, or other types of private and public clusters. For example, as part of a private cluster and/or a datacenter, in some embodiments, virtual computing system 100 may be hosted on a premise of an enterprise customer.

Again, it is to be understood again that only certain components and features of virtual computing system 100 are shown and described herein. Nevertheless, other components and features that may be needed or desired to perform the functions described herein are contemplated and considered within the scope of the present disclosure. It is also to be understood that the configuration of the various components of virtual computing system 100 described above is only an example and is not intended to be limiting in any way. Rather, the configuration of those components may vary to perform the functions described herein.

Hybrid System

Figure 2:
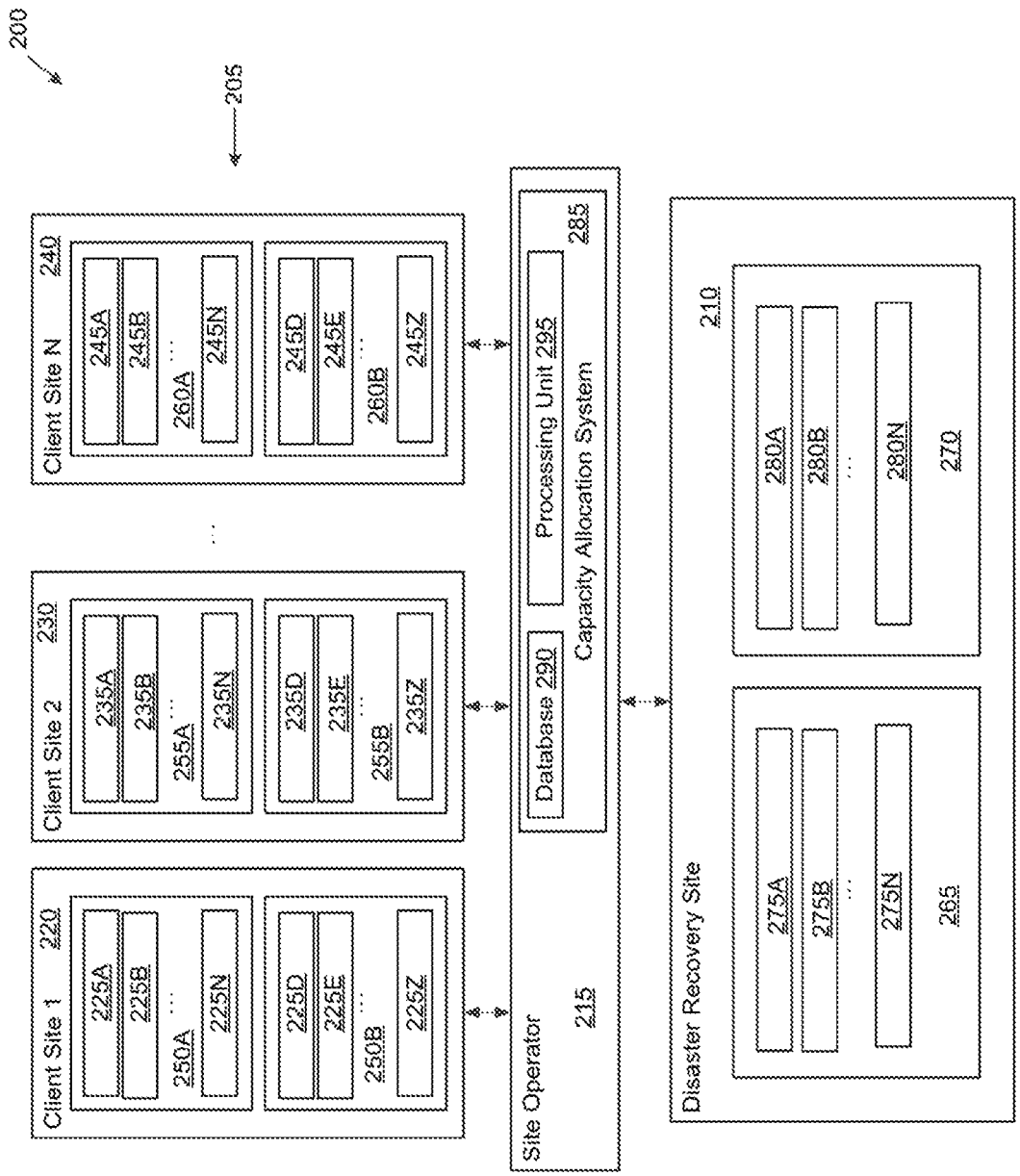
FIG. 2 is a block diagram of a hybrid system, in accordance with some embodiments of the present disclosure.

Turning now to FIG. 2, an example block diagram of a hybrid system 200 is shown, in accordance with some embodiments of the present disclosure. Hybrid system 200 is a virtual computing system that is organized into a plurality of client sites 205 that share resources of a disaster recovery site 210. A site operator 215 manages disaster recovery site 210, as well as the interaction between plurality of client sites 205 and the disaster recovery site. In some embodiments, each of the plurality of client sites 205 may be enterprise customers, organizations, or other entities associated with or otherwise hosting one or more clusters of a virtual computing system (e.g., the virtual computing system 100). For example, a client site 220 of plurality of client sites 205 may be associated with clusters 225A-225N and 225D-225Z, a client site 230 may be associated with clusters 235A-235N and 235D-235Z, and a client site 240 may be associated with clusters 245A-245N and 245D-245Z. Each of clusters 225A-225N, 225D-225Z, 235A-235N, 235D-235Z, 245A-245N, and 245D-245Z may be similar to the cluster shown in virtual computing system 100 of FIG. 1. Thus, although not shown, each of clusters 225A-225N, 225D-225Z, 235A-235N, 235D-235Z, 245A-245N, and 245D-245Z may include one or more user VMs, hypervisors, controller/service VMS, storage pool, and other elements described above with respect to FIG. 1. Further, each of clusters 225A-225N, 225D-225Z, 235A-235N, 235D-235Z, 245A-245N, and 245D-245Z may be configured for access by their respective client sites 220, 230, and 240.

It is to be understood that although each of plurality of client sites 205 have been shown as having a certain number of clusters (e.g., clusters 225A-225N, 225D-225Z, 235A-235N, 235D-235Z, 245A-245N, and 245D-245Z), each of those client sites may have any number of clusters. Further, the number of clusters in each of client sites 205 may vary from the number of clusters in the other client sites. Similarly, the configuration (e.g., number of virtual machines, the types of associated storage, and other hardware, software, and firmware features) of each of clusters (e.g., clusters 225A-225N, 225D-225Z, 235A-235N, 235D-235Z, 245A-245N, and 245D-245Z) of each of plurality of client sites 205 may vary from one embodiment to another.

Furthermore, clusters (e.g., clusters 225A-225N, 225D-225Z, 235A-235N, 235D-235Z, 245A-245N, and 245D-245Z) of each of plurality of client sites 205 may be divided into a first portion and a second portion. For example, client site 220 includes a first portion 250A that includes clusters 225A-225N and a second portion 250B that includes clusters 225D-335Z. Similarly, client site 230 includes a first portion 255A that includes clusters 235A-235N and a second portion 255B that includes clusters 235D-235Z, and client site 240 includes a first portion 260A that includes clusters 245A-245N and a second portion 260B that includes clusters 245D-245Z.

First portion 250A represents a subset of clusters (e.g., clusters 225A-225N) that client associated with client site 220 desires to migrate and operate from disaster recovery site 210 instead of from the client site pre-disaster (e.g., during non-disaster conditions), while second portion 250B represents subset of clusters (e.g., clusters 225D-225Z) that the client desires to operate from the client site itself pre-disaster and migrate to disaster recovery site 210 only during or after disaster conditions are identified. Similarly, first portion 255A of client site 230 and first portion 260A of client site 240 represents the portion of clusters (e.g., clusters 235A-235N, 245A-245N) that clients associated with those respective client site desires to migrate to disaster recovery site 210 pre-disaster and second portion 255B and second portion 260B represents those clusters (e.g., clusters 235D-235Z, 245D-245Z) that are normally operated from those respective client sites and migrated to the disaster recovery site during or post-disaster.

In some embodiments, virtual machines within clusters associated with the client site 220 migrate to clusters in the disaster recovery site 210 instead of the entire clusters. The migrating virtual machines may include virtual machines from multiple clusters within the client site 220 or just be from one cluster. Further, each virtual machine within one or a plurality of clusters may migrate to the disaster recovery site 210

It is to be understood that although at least three clusters are shown in each of the first portion (e.g., first portion 250A, 255A, and 260A) and the second portion (e.g., second portion 250B, 255B, and 260B) of each of plurality of client sites 205, number of clusters in each of the first portion and the second portion in each of the client sites may vary and may be different from one another. Additionally, although all of plurality of client sites 205 have been shown as having the first portion (e.g., first portion 250A, 255A, and 260A) and the second portion (e.g., second portion 250B, 255B, and 260B), it is to be understood that in some embodiments, some client sites may have only the second portion (e.g., operate all of the clusters from the client site pre-disaster) or only the first portion (e.g., operate all of the clusters from disaster recovery site 210 pre-disaster). Thus, the configuration of each of plurality of client sites 205 and the number of clusters that a particular client site desires to migrate pre-disaster to disaster recovery site 210 may vary from one embodiment to another.

Disaster recovery site 210 provides a platform for data backup and recovery for plurality of client sites 205. Specifically, disaster recovery site 210 provides resources to migrate the clusters or user VMs and associated data from one or more of plurality of client sites 205 to the disaster recovery site during actual or impending failure of operation of those client sites, or a failover event. In a failover event, a number of User VMs within one or a plurality of client sites 205 may fail to operate, so the data within the user VMS will migrate to clusters within clusters 275A-275N. Thus, disaster recovery site 210 provides a mechanism to maintain a continuity of operation and protection of resources of the plurality of client sites 205 during a failover event of those client sites, and thus, keep the client sites running without significant interruption until normal operations are resumed. Further, even though each of client sites 220, 230, and 240 are separate and configured for independent operation, each of those client sites may share disaster recovery site 210. Thus, disaster recovery site 210 is configured to store information from a plurality of client sites (e.g., plurality of client sites 205). Disaster recovery site 210 may be located in a location remote from plurality of client sites 205.

Thus, disaster recovery site 210 is a highly engineered, highly reliable platform that provides reliability of operation to plurality of client sites 205. Disaster recovery site 210 includes a reserve portion 265 and an allocation portion 270. Reserve portion 265 is reserved for disaster recovery purposes for receiving clusters from plurality of client sites 205 in the aftermath of a disaster condition. For example, reserve portion 265 is reserved for clusters 225D-225Z of client site 220, clusters 235D-235Z of client site 230, and clusters 245D-245Z of client site 240 that are operated from those client sites and migrated to disaster recovery site 210 only under disaster conditions. On the other hand, allocation portion 270 of disaster recovery site 210 is that portion of the disaster recovery site that receives clusters from plurality of client sites 205 pre-disaster. For example, allocation portion 270 is reserved for clusters 225A-225N of client site 220, clusters 235A-235N of client site 230, and clusters 245A-245N of client site 240 that are migrated to disaster recovery site 210 before a disaster and operate from the disaster recovery site.

As will be discussed in greater detail below, reserve portion 265 and allocation portion 270 are dynamically changing portions such that a capacity of each of those portions may vary dynamically based on the disaster conditions impacting plurality of client sites 205. Capacity of reserve portion 265 and allocation portion 270 may be defined in terms of the number of clusters within each of those portions. Specifically and similar to plurality of client sites 205, disaster recovery site 210 also includes a plurality of clusters having components similar to virtual computing system 100, albeit more engineered and more reliable. Each of reserve portion 265 and allocation portion 270 may, therefore, also include a plurality of clusters. For example, as shown in FIG. 2, reserve portion 265 may include a plurality of clusters 275A-275N, while allocation portion 270 may include a plurality of clusters 280A-280N.

It is to be understood that although at least three clusters (e.g., plurality of clusters 275A-275N and 280A-280N) are shown in each of reserve portion 265 and allocation portion 270, respectively, the number of clusters within each of those portions may vary, and each of those portions may have a different number of clusters. Further, each of clusters (e.g., plurality of clusters 275A-275N and 280A-280N) within reserve portion 265 and allocation portion 270 may be configured differently from other clusters. Also, disaster recovery site 210 is shown as having only the clusters (e.g., plurality of clusters 275A-275N and 280A-280N) simply for ease of instruction. Generally speaking, disaster recovery site 210 is intended to include other components that are desired or needed to perform the functions described herein or to properly operate the disaster recovery site for its intended purpose.

Disaster recovery site 210 is managed by site operator 215. Site operator 215 is a service provider that serves as an intermediary between plurality of client sites 205 and disaster recovery site 210. Site operator 215 may or may not own disaster recovery site 210. Site operator 215 may determine that a disaster condition at one or more of plurality of client sites 205 is occurring or is about to occur. In response to the determination of the disaster condition, site operator 215 may migrate the clusters (e.g., clusters 225D-225Z, 235D-235Z, and 245D-245Z) from client sites 220, 230, and 240, respectively, to disaster recovery site 210, and particularly, to reserve portion 265 of disaster recovery site 210.

To facilitate the determination of the disaster conditions and migrate the clusters (e.g., clusters 225D-225Z, 235D-235Z, and 245D-245Z) to disaster recovery site 210, site operator 215 may enter into agreements, such as Service Level Agreements ("SLAs"), with plurality of client sites 205. The SLAs define the level of service that plurality of client sites 205 is to receive from site operator 210 in relation to disaster recovery site 210. Thus, the SLAs may specify a variety of performance related requirements/parameters. For example, one such performance parameter is referred to as a Recovery Time Objective ("RTO"). RTO is measured forward in time from the moment a disaster condition occurs and is indicative of the time when a particular resource (e.g., user VM, clusters, etc.) is back up and running. In other words, RTO specifies the amount of downtime from the time a disaster condition strikes that a resource will be inoperative. Lower RTOs are desirable. RTO's may be measured in seconds, minutes, hours, or other units of time.

As indicated above, disaster recovery site 210 includes reserve portion 265 and allocation portion 270. Site operator 215 may determine the capacity of reserve portion 265 and allocation portion 270. Thus, site operator 215 includes a capacity allocation system 285 that dynamically determines the capacity of reserve portion 265 and allocation portion 270 of disaster recovery site 210, as discussed below. Although the capacity allocation system 285 has been shown as being part of site operator 215 in FIG. 2, the capacity allocation system may be part of disaster recovery site 210 and/or plurality of client sites 205. Further, capacity allocation system 285 may be owned, operated, and otherwise managed by the any one or more of plurality of client sites 205 or a third party.

Further, capacity allocation system comprises a database 290 for storing a variety of information including allocation information of allocation portion 270, as directed herein, as well as a processing unit 295 for computing the capacities of reserve portion 265 and the allocation portion. Thus, processing unit 295 may be configured to execute instructions. The instructions may be carried out by a special purpose computer, logic circuits, or hardware circuits. Processing unit 295 may be implemented in hardware, firmware, software, or any combination thereof. Again and as indicated above, the term "execution" is, for example, the process of running an application or the carrying out of the operation called for by an instruction. The instructions may be written using one or more programming language, scripting language, assembly language, etc. Processing unit 295, thus, executes an instruction, meaning that it performs the operations called for by that instruction.

Processing unit 295 may be operably coupled to database 290 of capacity allocation system 285 to receive, send, and process information, and to control the operations of computing reserve portion 265 and allocation portion 270. Processing unit 295 may retrieve a set of instructions from database 290, such as, from a permanent memory device like a read only memory ("ROM") device and copy the instructions in an executable form to a temporary memory device that is generally some form of random access memory ("RAM"). Processing unit 295 may include a single stand-alone processing unit, or a plurality of processing units that use the same or different processing technology.

Although capacity allocation system 285 has been shown as having only database 290 and processing unit 295, in other embodiments, the capacity allocation system may include other hardware, software, and firmware components that may be needed to perform the functions described herein. Likewise, although site operator 215 has been shown as only having capacity allocation system 285, in other embodiments, site operator 215 may include a variety of hardware, software, and firmware components that are configured to facilitate communication between plurality of client sites 205 and disaster recovery site 210, facilitate the migration of clusters between the client sites and the disaster recovery site, as well as operate, manage, and monitor the disaster recovery site, and possibly the plurality of client sites.

CO Node

Figure 3:
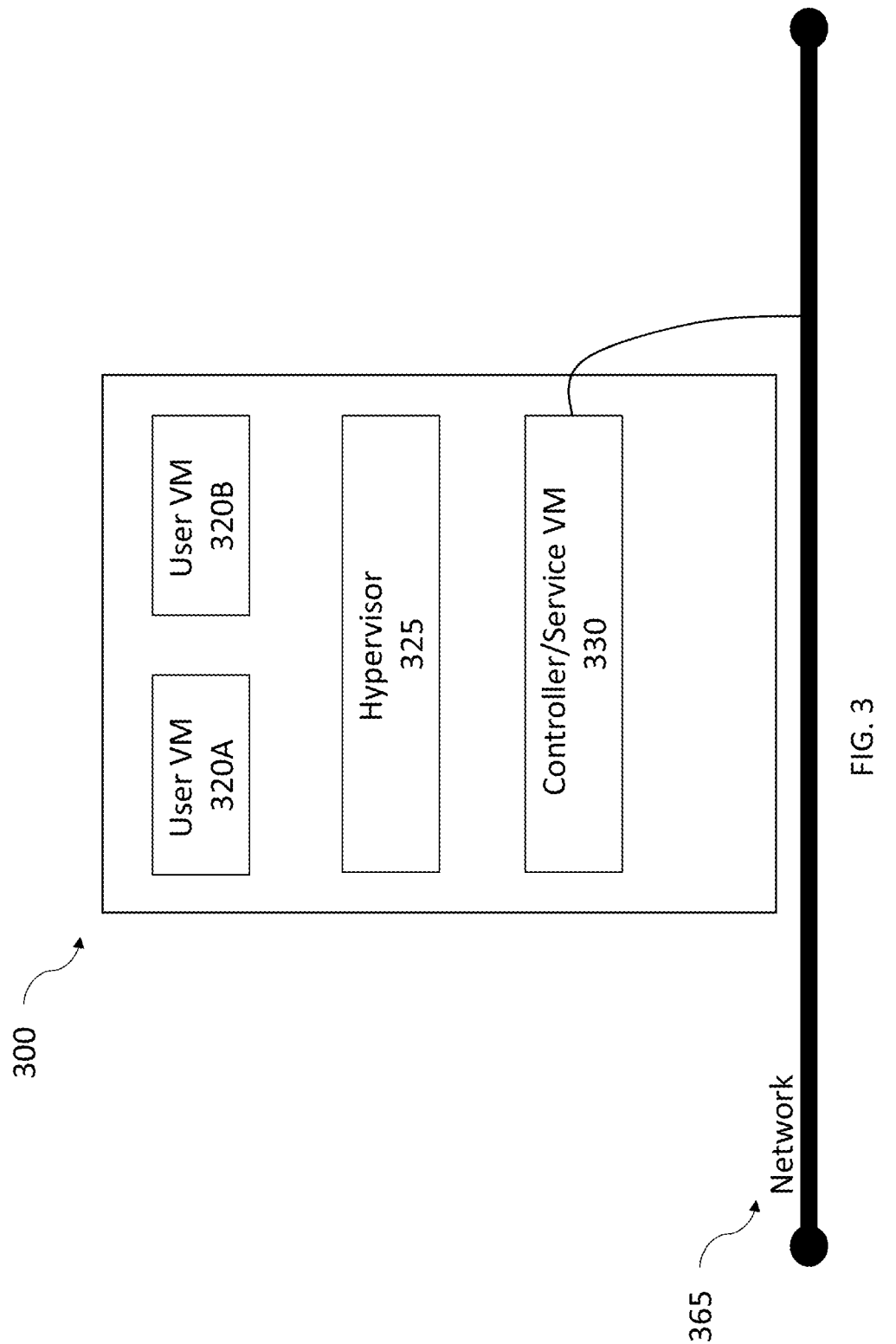
FIG. 3 is a block diagram of a compute only node attached to a network, in accordance with some embodiments of the present disclosure.

Referring now to FIG. 3, a block diagram of a compute only node (CO node) 300 attached to a network 365 is shown, in accordance with some embodiments of the present disclosure. CO node 300 includes user VMs 320A and 320B (collectively referred to herein as "user VMs 320"), a hypervisor 325 configured to create and run user VMs 320, and a controller/service VM 330 configured to manage, route, and otherwise handle workflow requests between the various nodes of virtual computing system 100, shown in FIG. 1. Controller/service VM 330 is connected to network 365 to facilitate communication between other nodes on the network. Although not shown, in some embodiments, user VMs 320 and hypervisor 325 may also be connected to network 365. Although only one CO node 300 is shown, any number of CO nodes 300 can be connected to network 365. In some embodiments, CO node 300 does not include a controller/service VM 330.

User VMs 320 include CPU cores (not shown) and memory (not shown) for CO node 300. CPU cores are processors on the underlying hardware of a user VM. The CPU cores read and execute program instructions such as add, move data, and branch. User VMs 320 may have multiple cores that allow user VMs 320 to run multiple instructions on separate cores at the same time. Memory is generally defined as the RAM of the underlying hardware of user VM 320, but is not limited to RAM.

CO node 300 remains dormant and not connected to any clusters on network 365 until a request comes from a cluster on network 365 asking for CO node 300 to connect with one of clusters 275A-275N, shown in FIG. 2, (collectively referred herein as "cluster 275"). CO node 300 may connect with any number of clusters 275. If CO node 300 is not currently operating in another cluster, CO node 300 will connect with the requesting cluster. Once CO node 300 connects with cluster 275, CO node 300 can compute operations as necessary for cluster 275 and provide cluster 275 with temporary memory and additional CPU cores. Cluster 275 can request that any number of CO nodes 300 join cluster 275. Further, any number of clusters 275 can request for any number of CO nodes 300 to join their respective cluster.

Unlike nodes 105, 110 and 115, shown in FIG. 1, CO node 300 does not include DAS storage, shown above, or any other type of storage outside of memory (RAM). In some embodiments, CO node 300 may include a local-storage based write-through cache, such as a solid state drive (SSD). When CO node 300 joins a cluster, the cluster can use CO node's 300 CPU cores and memory, but cannot write any data into storage. Consequently, once cluster 275 no longer needs CO node 300, cluster 275 can easily remove CO node 300 without removing any data written into storage. In contrast, when nodes 105, 110, and 115, which have storage, join a cluster, such as cluster 275, the cluster immediately transfers data already written on cluster 275 to the DAS on nodes 105, 110 and 115. Once nodes 105, 110, and 115 are no longer needed on cluster 275, cluster 275 can remove nodes 105, 110, and 115 from cluster 275 after removing the data from storage on nodes 105, 110 and 115.

Expansion of Cluster with CO Nodes before Upgrade

Figure 4:
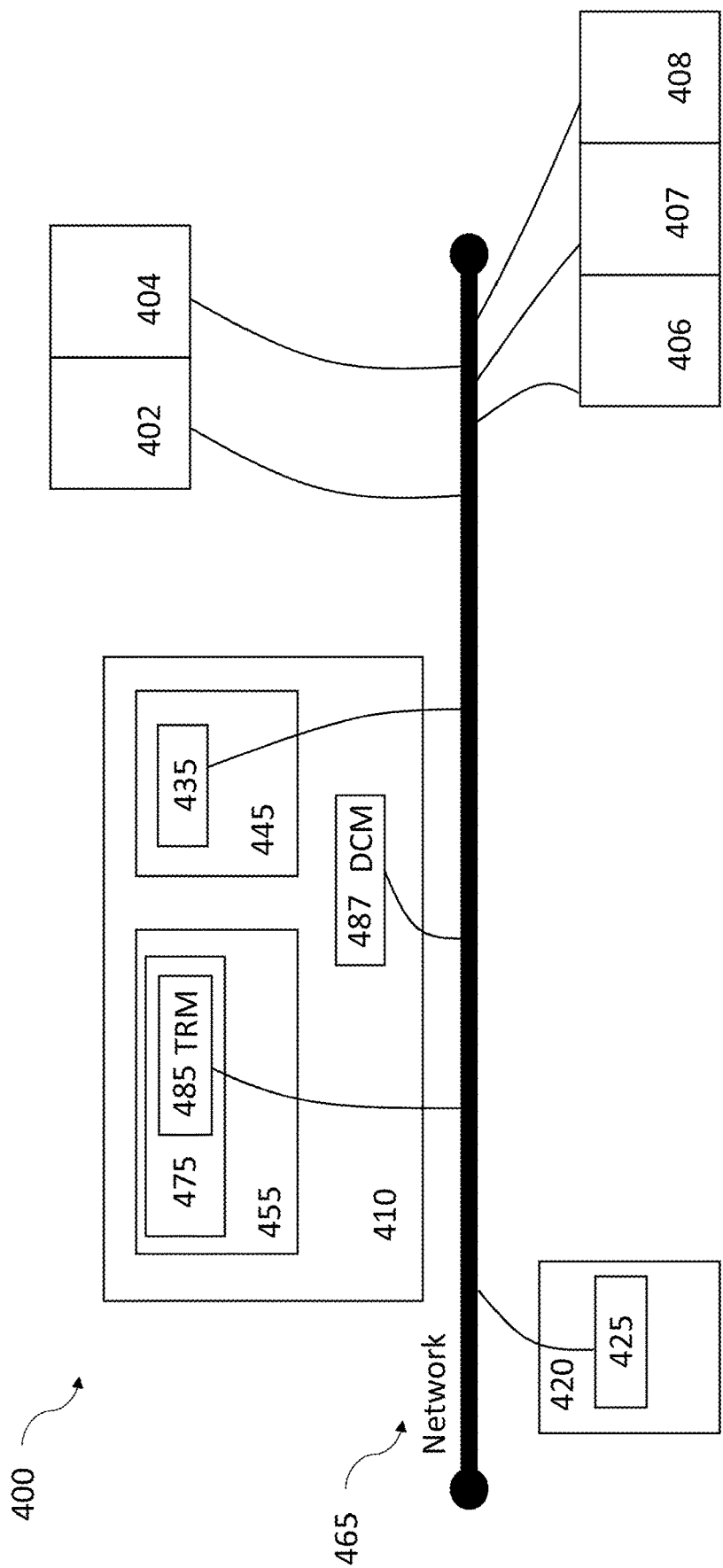
FIG. 4 is a block diagram of an expansion system, in accordance with some embodiments of the present disclosure.

Referring to FIG. 4, a block diagram of an expansion system 400 is shown, in accordance with some embodiments of the present disclosure. Expansion system 400 includes CO nodes 402 and 404, nodes 406, 407, and 408, a disaster recovery site 410, a client site 420, and a network 465. CO nodes 402 and 404, nodes 406, 407, and 408, disaster recovery site 410, and client site 420 are all connected to each other via network 465. CO nodes 402 and 404 and nodes 406, 407, and 408 may be located inside or outside disaster recovery site 410. There can be any number of CO nodes 402 and 404 and nodes 406, 407, and 408 attached to network 465. Nodes 406, 407, and 408 are similar to nodes 105, 110, and 115 which are shown in FIG. 1. Disaster recovery site 410 includes an allocation portion 445, similar to allocation portion 270 in FIG. 2; a reserve portion 455, similar to reserve portion 265, shown in FIG. 2; and a Data Center Manager (DCM) 487. Allocation portion 445 includes a cluster 435, which is similar to clusters 280, shown in FIG. 2, and can include any number of clusters. Reserve portion 455 includes a cluster 475, which is similar to clusters 275 shown in FIG. 2, and can include any number of clusters. Cluster 475 is similar to cluster 275A, shown in FIG. 2, and includes a TRM 485. The clusters in allocation portion 445 and reserve portion 445 may all have TRMs. TRM 485 may be a processor, micro-processor, or any other processing device. TRM 485 communicates with DCM 487 over network 465. DCM 487 may be located at disaster recovery site 410 and may be outside or inside of cluster 475. DCM 487 may be a processor, micro-processor, or any other processing device.

CO nodes 402 and 404 are attached to network 465. CO nodes 402 and 404 are similar to CO node 300, shown in FIG. 3. Any number of CO nodes 402 and 404 may be attached to network 465. When initially attached to network 465, CO nodes 402 and 404 are not connected to any cluster in disaster recovery site 410. However, when a cluster calls for CO node 402 and 404 to attach to the cluster, any CO node 402 and 404 in network 465 may attach to any cluster that is also attached to network 465. Further, a cluster 475 may call one or a plurality of nodes 406, 407, and 408, to attach to cluster 475.

Referring still to FIG. 4, Client site 420 includes a cluster 425. Cluster 425 and cluster 435 are connected to network 465. Client site 420 is similar to client site 220, shown in FIG. 2. Cluster 425 is similar to cluster 225, shown in FIG. 2. Cluster 425 includes data and is connected to cluster 475 via network 465 in case there is failover event on cluster 425. If there is a failover event, the data from user VMs on cluster 425 migrates to cluster 475, as described above. There can be any number of client sites containing any number of clusters attached to network 465. Any number of clusters on the client sites may be connected to cluster 475 or any number of clusters in disaster recovery site 410.

Figure 5:
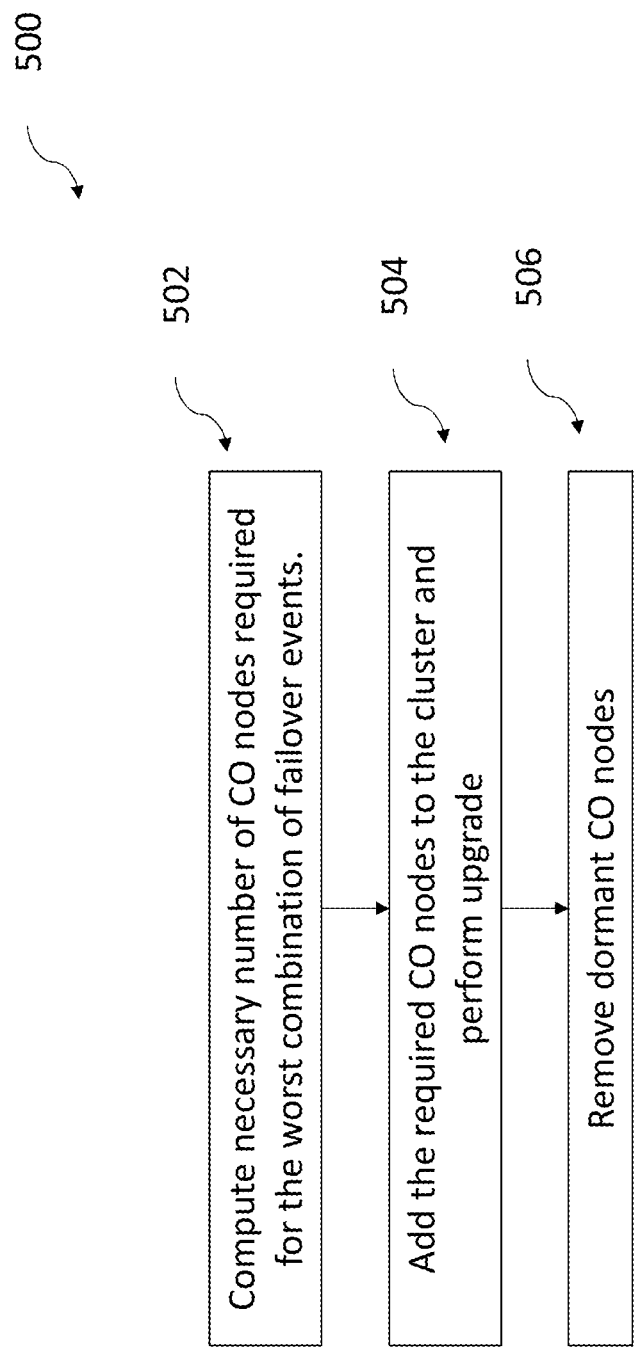
FIG. 5 is an example flowchart outlining an expansion process for creating an expansion system, in accordance with some embodiments of the present disclosure.

Turning now to FIG. 5, an example flowchart outlining an expansion process 500 for creating an expansion system is shown, in accordance with some embodiments of the present disclosure. Expansion process 500 may include additional, fewer, or different operations depending on the particular embodiment. Expansion process 500 may be implemented by a TRM on a system similar to the expansion system described above with reference to FIG. 4. Expansion process 500 is the process of adding one or more CO nodes or any number of nodes that include storage to one or more clusters in a reserve portion of a disaster recovery site before the cluster upgrades and removing any unused CO nodes or nodes with data storage (hereinafter "nodes with storage") from the cluster once the upgrade is complete. If any user VMs within a cluster or a plurality of clusters at a client site experience a failover event while the cluster in the reserve portion is upgrading, the cluster in the reserve portion will already have the memory and CPU core resources to handle a migration of the data from the user VMs. The cluster in the reserve portion will not need to add any nodes during the upgrade to handle the migration.

According to an illustrative embodiment, a TRM performs each operation in expansion process 500. The TRM may be involved in more operations before, during, or after the cluster upgrades; this disclosure is not meant to be limiting. The following are brief descriptions of operations performed by the TRM in expansion process 500. In a computing operation 502, the TRM receives a signal indicating an upgrade at a cluster in the reserve portion is about to start and calculates the number of CO nodes required to handle the most computing power and memory the upgrading cluster will need to handle in case of a failover event at one or a plurality of user VMs. Computing operation 502 is further described with reference to FIG. 6. In an addition operation 504, the TRM directs a DCM to add the calculated number of CO nodes to the cluster, and the DCM does so. The upgrade is then performed at the cluster. In some embodiments, the TRM may drive the upgrade. Addition operation 504 is further described with reference to FIG. 7. In a removal operation 506, the TRM receives a notification that the upgrade is complete and directs the DCM to remove the CO nodes that are not being used from the cluster, and the DCM does so. Removal operation 506 is further described with reference to FIG. 8.

Expansion process 500 prepares the cluster in the reserve portion of the disaster recovery site for a migration of any number of user VMs experiencing a failover event. During a failover event, the cluster acts as a redundant or standby computer server, system, or hardware component that can take over the data management of the user VMs experiencing the failover event. A failover event may occur when a disaster strikes the servers the user VMs are operating on such as a fire, earthquake, flood, computer virus, accident, or any other number of disasters or issues that would cause the user VMs to stop working. Once the disaster or issue occurs, data from the user VMs experiencing the failover event migrate over to the cluster so the data can still be accessed and used during the disaster or issue. Expansion process 500 allows the cluster or any other number of clusters in the reserve portion of the disaster recovery site to handle a failover event when the one or more clusters is going through an upgrade, regardless of the amount of data and processing power that is required of the cluster.

Expansion process 500 may also work during a switchover. Similar to a failover, a switchover suddenly stops user VMs from operating, causing the user VMS to migrate to a cluster in the recovery portion of the disaster recovery site. However, switchovers are pre-planned stoppages instead of sudden unexpected events. Using the same operations as for a failover event, expansion process 500 ensures a cluster in a reserve portion of a disaster recovery site can handle the computing and memory requirements of a migration of data during a switchover event while the cluster is upgrading by adding nodes with or without storage to the cluster before the cluster upgrades and then removing the nodes the cluster no longer needs once the switchover event is over.

Figure 6:
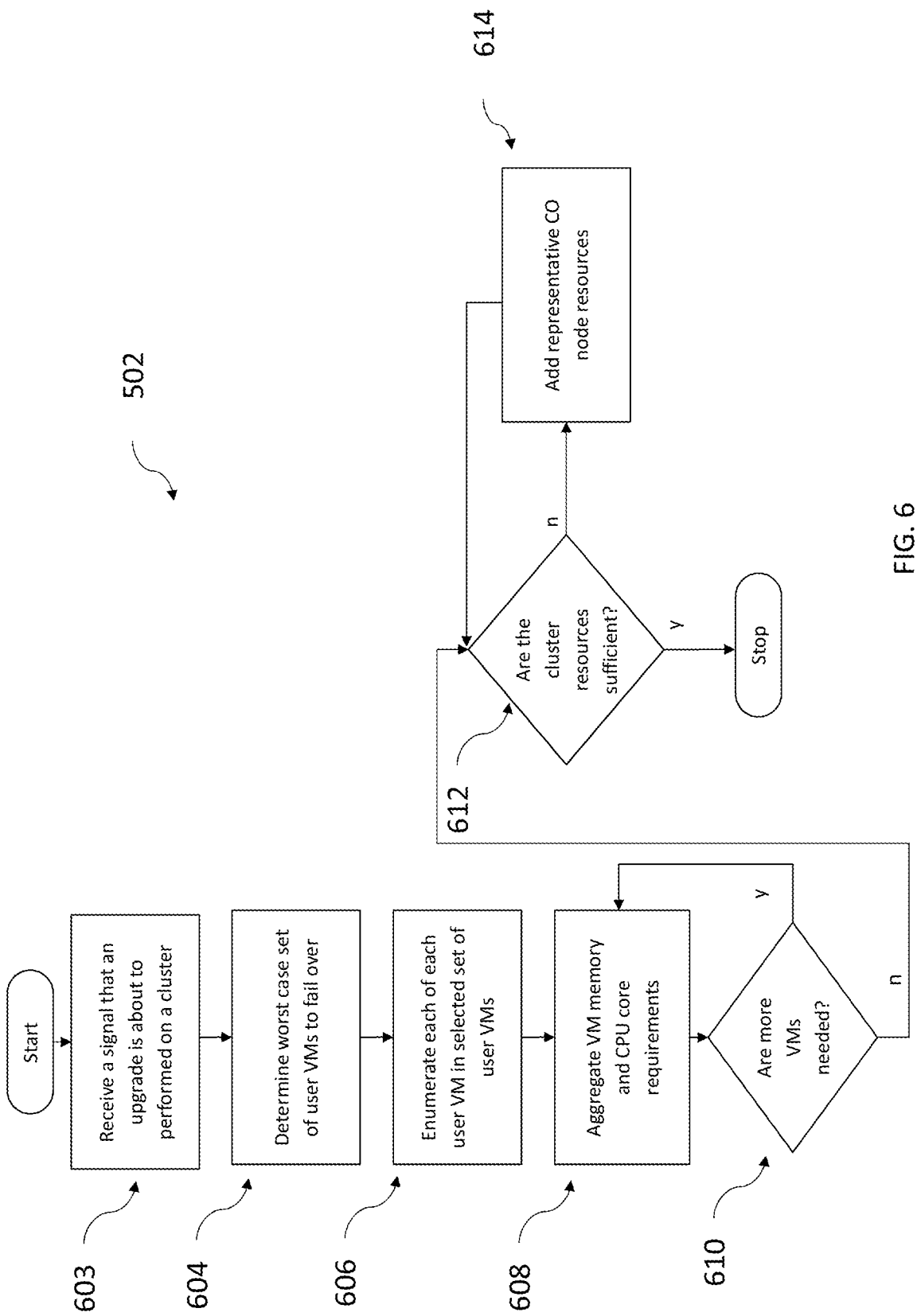
FIG. 6 is an example flowchart outlining a computing operation, shown in FIG. 5, in accordance with some embodiments of the present disclosure.

Turning now to FIG. 6, an example flowchart outlining computing operation 502, described with reference to FIG. 5, is shown, in accordance with some embodiments of the present disclosure. Computing operation 502 may include additional, fewer, or different operations, depending on the particular embodiment. Computing operation 502 is discussed in conjunction with components described with reference to FIG. 4. As a brief summary, in computing operation 502, a TRM determines a number of CO nodes that a DCM needs to add to a cluster in a reserve portion of a disaster recovery site in case there is a failover event at user VMs within a client site while the cluster is undergoing an upgrade. In an operation 603, the TRM receives a signal from a cluster in a reserve portion of a disaster recovery site indicating that an upgrade is about to commence on that cluster. In an operation 604, the TRM determines the memory and CPU core requirements in each user VM that could migrate to the cluster that is about to receive an upgrade. The TRM compares the CPU node and memory requirements of each user VM and forms a worst case set of user VMs based on how many user VMs a product management team says could experience a failover event at a given time. In an operation 606, the TRM takes data including the memory and CPU core requirements from each user VM in the worst case set of user VMs. In an operation 608, the TRM aggregates the memory and CPU core requirements of the user VMs in the worst case set of user VMs. In an operation 610, the TRM looks to see if all of the user VMs within the worst case set of user VMs have been accounted for. If the TRM finds that there are more user VMs that need to be included, the TRM aggregates the memory and CPU core requirements of these user VMs and continues searching and aggregating the memory and CPU core requirements of each user VM until all of the user VMs within the worst case set of user VMs have been accounted for. In an operation 612, the TRM calculates the total memory and CPU core resources of the cluster in the reserve portion of the disaster recovery site. In an operation 612, the TRM determines if the cluster's resources are sufficient to handle a migration of the worst case set of user VMs. In an operation 614, the TRM adds a value representing a CO node's resources to a value representing the cluster's resources and then determines if the cluster with the added CO node has enough resources to handle a failover event at the worst case set of user VMs. The TRM repeats operations 612 and 614 until the TRM calculates that the cluster can handle a migration of the worst case set of user VMs during the upgrade.

In operation 603, the TRM receives a signal from a cluster in the reserve portion indicating that the cluster is about to perform an upgrade. Expansion process 500 begins once the TRM receives and processes this signal.

In operation 604, the TRM determines the worst case set of user VMs. The worst case set of user VMs is defined as the combination of user VMs that would require the most CPU cores and memory at the cluster in the reserve portion of the disaster recovery site if they experienced a failover event at the same time and migrated to the cluster. In determining the worst case set of user VMs, the TRM relies on an assumption set by a product management team where the product management teams sets the maximum percentage of user VMs that could experience a failover event at the same time. The percentage set by the product management team can be between 0% and 100%. The TRM uses this percentage, X %, and then forms the worst case set of user VMs from the X % of user VMs that require the most CPU core and memory requirements. For example, if there are ten user VMs that could failover and migrate to the cluster in the reserve portion of the disaster recovery site, and the product management team determines that data on 60% of the user VMs could migrate to the cluster at the same time, then the worst case set of user VMs of the ten user VMs would be the six user VMs that require the most CPU cores and memory. In some embodiments, computing a first number of nodes includes multiplying a probability percentage by a number of user VMs to obtain a set of user VMs including a plurality of user VMs with CPU cores and memory.

In another embodiment, operation 604 is performed by aggregating the resources of each possible combination of user VMs within the constraints set by product management to determine the combination of user VMs that requires the most resources, or the worst case set of user VMs. Applying the example above to this embodiment, if there are ten user VMs that could failover and migrate to a cluster in the reserve portion of the disaster recovery site, and the product management team determines 60 percent of the user VMs can failover at a given time, the TRM will iteratively calculate the resource requirements of every possible combination of six user VMs within the ten user VMs that could failover. The combination of user VMs that requires the most resources is the worst case set of user VMs.

In operation 606, the TRM determines how much memory and CPU nodes each user VM in the worst case set of user VMs requires. The TRM stores this data so it can calculate the total memory and computing requirements of the cluster undergoing the upgrade.

In operation 608, the TRM calculates the memory and CPU core requirements the cluster in the reserve portion of the disaster recovery site needs to be able to handle in case each user VM in the worst case set of user VMs experiences a failover event and migrates at the same time. The calculations are shown below:

c is the user VM being aggregated.

U(c) is the memory of each user VM in the worst case set of user VMs.

f(c) is the number of CPU cores each user VM has in the worst case set of user VMs Total Memory requirement of the worst case set of user VMs=$\Sigma_c U(c)$ Total CPU core requirement of the worst case set of user VMs=$\Sigma_c f(c)$ The calculations show that the TRM aggregates the memory of each user VM in the worst case set of user VMs to obtain a total memory requirement of the worst case set of user VMs. The TRM also calculates the total CPU core requirement of the worst case set of user VMs by aggregating the CPU cores of each user VM in the worst case set of user VMs. The cluster needs to be able to meet both the total memory and the total CPU core requirements of the worst case set of user VMs for migrating user VMs while the cluster is upgrading.

In operation 610, after determining the total memory and CPU cores that the cluster needs to provide for a migration of a worst case set of user VMs, the TRM may add a buffer in case more user VMs than expected migrate to the cluster or the user VMs require more resources at the cluster than the TRM calculated they would. The buffer contains more memory and CPU cores and, thus, allows the cluster to handle more data and computing power than the TRM calculated the cluster in the reserve portion of the disaster recovery site would need in operation 608. The amount of resources in the buffer can be preselected, a percentage of the CPU core and memory requirements, or determined through another method. In one embodiment, to calculate the resources provided in the buffer, the TRM determines the memory and CPU cores of the user VMs that could migrate to the cluster but were not included in the worst case set of user VMs and adds the value of these resources, or a fraction of these resources, into the previously calculated total memory and CPU core requirements. In another embodiment, the TRM performs operation 608 with the worst case set of user VMs and then adds a predetermined amount of CPU core and memory, as the buffer, to the Total CPU core and memory requirements to determine how much memory and CPU cores the cluster needs.

In operation 612, the TRM determines whether the cluster in the reserve portion has a sufficient amount of CPU core and memory resources to meet the CPU core and memory requirements calculated above. If the cluster has the requisite resources, the calculation is complete and the cluster can be upgraded.

As shown in operation 614, however, if the cluster does not have the resources to handle a migration of the worst case set of user VMs, the TRM calculates the CPU core and memory resources of a CO node and calculates the resources of the cluster if a CO node was added to the cluster. If, the TRM calculates that the cluster still does not have enough CPU core or memory resources after adding the CO node, the TRM will add the resources of another CO node to the resources of the cluster in its calculations and keeps track of the number of CO node's resources it adds. Operations 612 and 614 will repeat until the cluster has enough CPU core and memory resources to handle a migration of the worst case set of user VMs without adding more CO nodes or nodes containing storage to the cluster while the cluster is upgrading.

In operations 612 and 614, the TRM calculates the number of CO nodes needed to reach both the total CPU core and the memory resource requirements of the cluster by adding the resources of CO nodes to the resource count of the cluster one at a time until both the CPU core and memory requirements are met. If the CPU core requirement is met before the memory requirement, the TRM will continue to add the value of the resources of CO nodes into its calculations until the memory requirement of the worst case set of user VMs is met. If the memory requirement is met before the CPU core requirement, the TRM will continue to add the value of the resources of CO nodes into its calculations until the CPU requirement of the worst case set of user VMs is met.

Figure 7:
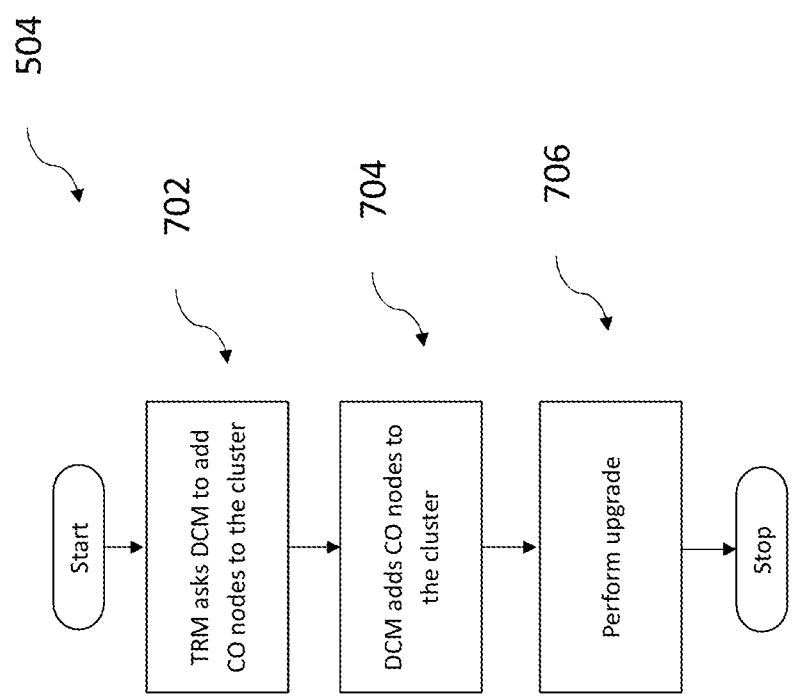
FIG. 7 is an example flowchart outlining an addition operation, shown in FIG. 5, in accordance with some embodiments of the present disclosure.

Turning now to FIG. 7, an example flowchart outlining addition operation 504, described with reference to FIG. 5, is shown, in accordance with some embodiments of the present disclosure. Addition operation 504 may include additional, fewer, or different operations, depending on the particular embodiment. Addition operation 504 is discussed in conjunction with components described with reference to FIG. 4. As a brief summary, in an operation 702, a TRM asks a DCM to add a calculated number of CO nodes to a cluster in the disaster recovery site. In an operation 704, a DCM adds one or more CO nodes to the cluster. In an operation 706, the cluster starts upgrading and the TRM receives a notification that the upgrade has started.

In operation 702, the TRM asks the DCM to add a number of CO nodes to the cluster that is about to undergo an upgrade. The number of CO nodes that the TRM asks the DCM to add to the cluster is the number of CO nodes the TRM calculated in computing operation 502.

In operation 704, after the TRM asks the DCM to add the CO nodes to the cluster, the DCM searches for CO nodes on a network that connects CO nodes, nodes with storage, clusters in client sites, and clusters in a disaster recovery site together. The DCM adds the CO nodes to the cluster as long as there are CO nodes available.

If there are not any CO nodes available to add to the cluster, the TRM can perform the same calculations with nodes with storage as it did in calculation operation 502. Instead of adding CO nodes to the cluster in the recovery portion of the disaster zone, the TRM determines the memory and CPU core resources of nodes with storage on the network and determines the number of the nodes with storage that need to be added so the cluster can handle a migration of the worst case set of user VMs. After determining the number of nodes with storage that need to be added, the TRM directs the DCM to add the nodes with storage to the cluster, and the DCM adds the nodes with storage that are not currently supporting a cluster from the network.

The process is similar if there are CO nodes available but not enough CO nodes on the network to meet the CPU core and memory requirements for the cluster. In this scenario, the TRM directs the DCM to add all of the available CO nodes to the cluster, and then calculates the remaining CPU core and memory requirements to meet the calculated CPU core and memory needs of the cluster. The TRM calculates the number of nodes with storage that are needed to meet the CPU core and memory requirements, and then directs the DCM to add nodes with storage to the cluster until the calculated CPU core and memory requirements of the cluster are met.

In operation 706, after adding CO nodes and/or nodes that include storage to the cluster, the cluster can be upgraded. The upgrade can be an automatic upgrade that is performed at a user selected time interval, an upgrade requested at one of the nodes with or without storage, or an upgrade started through any other method. The upgrade can be an improvement on the clusters memory, storage capability, computation power, user interface, operating system, or an improvement on any other aspect of the cluster.

Figure 8:
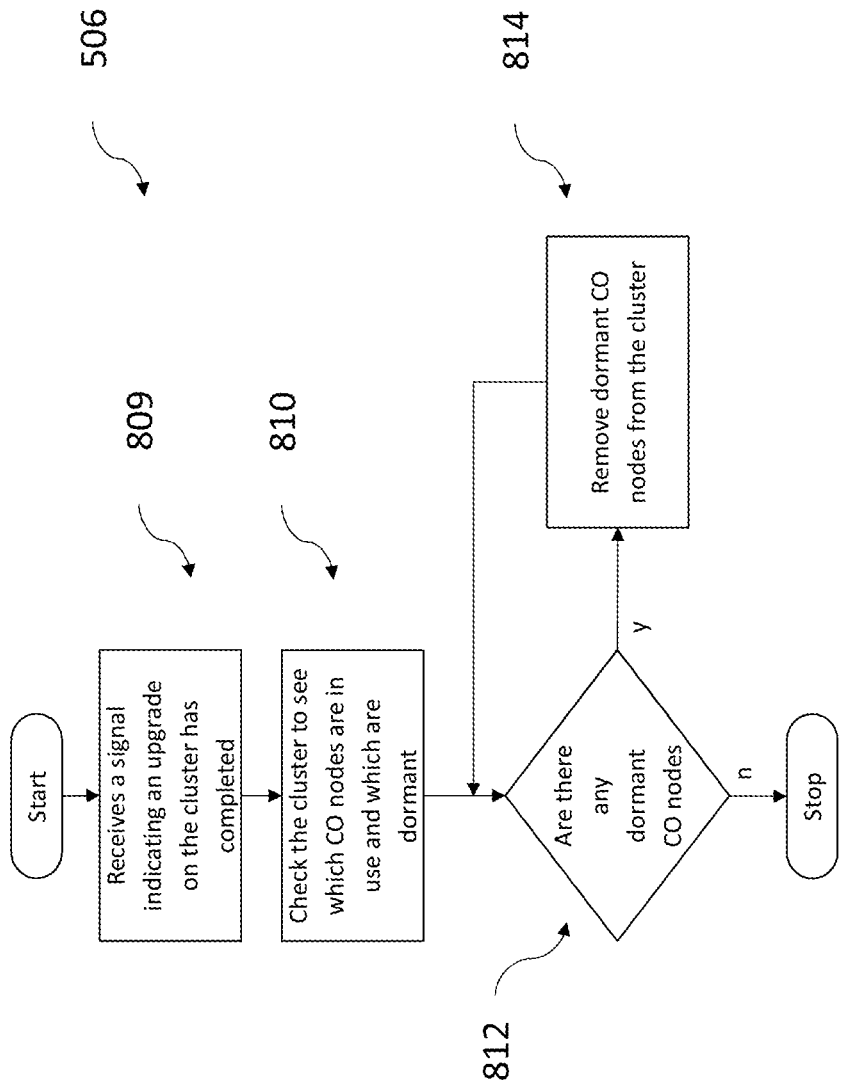
FIG. 8 is an example flowchart outlining a removal operation, shown in FIG. 5, in accordance with some embodiments of the present disclosure.

Turning now to FIG. 8, an example flowchart outlining a removal operation 506, described with reference to FIG. 5, is shown, in accordance with some embodiments of the present disclosure. Removal operation 506 may include additional, fewer, or different operations, depending on the particular embodiment. Removal operation 506 is discussed in conjunction with components described with reference to FIG. 4. As a brief summary, removal operation 506 is the process of removing nodes from a cluster in a reserve portion after a TRM receives a notification that an upgrade on the cluster is complete. In an operation 809, the TRM receives a notification indicating that the upgrade on the cluster is complete. In an operation 810, the TRM checks the upgraded cluster to see which CO nodes the upgraded cluster is currently using and which CO nodes it is not. CO nodes that are not in use are dormant CO nodes. In some embodiments, the TRM checks CO nodes to determine if data from user VMs can migrate from CO nodes to nodes with storage to create dormant nodes. In an operation 812, the TRM checks the cluster to determine if there are any dormant CO nodes in the cluster. If there are not any dormant CO nodes then removal operation 506 is complete. However, if there are dormant CO nodes in the cluster, the TRM removes them in an operation 814. In operation 814, if there are dormant CO nodes, the TRM tells a DCM at the disaster recovery site to remove the dormant CO nodes from the cluster, and the DCM does so. After the DCM removes the dormant CO nodes from the cluster, the TRM checks the cluster again to see if there are any dormant CO nodes. Operations 812 and 814 repeat until the TRM determines that each CO node in the cluster is being used by the cluster. The TRM may also check if there are nodes with storage that are being used by the cluster and remove any nodes containing storage that are not in use. Once the dormant CO nodes and/or the unused nodes with storage are removed from the cluster, they remain on the network and can be called to join another cluster to improve the computation and memory capabilities of that cluster.

Expansion process 500 can be completed by adding any number of nodes with storage and is not meant to limit the process to adding any number of nodes with storage. Nodes with storage may have any amount of memory, CPU cores, and storage. Further, expansion process 500 can be completed by adding any number of CO nodes to the cluster undergoing an upgrade and is not meant to limit the process to adding any number of CO nodes. The CO nodes may have any amount of memory and CPU cores.

It is also to be understood that in some implementations, any of the operations described herein may be implemented at least in part as computer-readable instructions stored on a computer-readable memory. Upon execution of the computer-readable instructions by a processor, the computer-readable instructions may cause a node to perform the operations.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A method comprising:
   receiving, by a processor that executes computer-readable instructions stored on a memory, a first signal indicating a disaster recovery cluster is about to commence an upgrade;
   upon receiving the first signal, determining, by the processor, a total amount of computing resource needed by the disaster recovery cluster to receive migrated entities from a second cluster during the upgrade, wherein determining the total amount of the computing resource comprises:
      determining, by the processor, a number of the entities of the second cluster to be migrated to the disaster recovery cluster during the upgrade;
      identifying, by the processor, which of the number of the entities require a maximum amount of the computing resource;
      computing, by the processor, an initial computing resource requirement by aggregating the maximum amount of the computing resource of each of the number of the entities requiring the maximum amount of the computing resource; and
      determining, by the processor, the total amount of the computing resource based on the initial computing resource requirement;
   adding, by the processor, a first number of compute only nodes to the disaster recovery cluster before the upgrade, wherein adding the first number of the compute only nodes comprises:
      comparing, by the processor, the total amount of the computing resource with an available amount of the computing resource at the disaster recovery cluster to determine an extra amount of the computing resource needed by the disaster recovery cluster to satisfy the total amount of the computing resource;
      determining, by the processor, the available amount of the computing resource at each compute only node; and
      adding, by the processor, the first number of the compute only nodes to the disaster recovery cluster based upon the available amount of the computing resource at each compute only node to satisfy the extra amount of the computing resource;
   receiving, by the processor, a second signal indicating the upgrade of the disaster recovery cluster is complete; and
   removing, by the processor, a second number of the compute only nodes from the disaster recovery cluster upon receiving the second signal, wherein removing the second number of the compute only node comprises:
      identifying, by the processor, which ones of the first number of the compute only nodes added to the disaster recovery cluster are dormant; and
      removing, by the processor, the dormant ones of the compute only nodes.

2. The method of claim 1, further comprising adding, by the processor, an additional computing resource requirement to the initial computing resource requirement to obtain the total amount of the computing resource.

3. The method of claim 1, wherein the second number of nodes is no greater than the first number of nodes.

4. The method of claim 1, further comprising determining that the compute only nodes are insufficient to satisfy the extra amount of the computing resource.

5. The method of claim 4, further comprising adding at least one node with storage upon determining that the compute only nodes are insufficient to satisfy the extra amount of the computing resource.

6. The method of claim 1, wherein determining the number of the entities comprises multiplying a percentage by a total number of the entities in the second cluster.

7. The method of claim 1, wherein the computing resource comprises at least one of amount of memory or central processing unit core resources.

8. The method of claim 7, wherein the total amount of the computing resource needed by the disaster recovery cluster comprises a first total amount of the memory needed by the disaster recovery cluster and a second total amount of the central processing unit core resources needed by the disaster recovery cluster.

9. The method of claim 8, wherein the first number of nodes comprises enough number of nodes to satisfy the first total amount of the memory as well as the second total amount of the central processing unit core resources.

10. The method of claim 1, wherein identifying the dormant ones of the compute only nodes comprises identifying the compute only nodes that are not in use.

11. A system comprising:
   a processor that executes computer-readable instructions stored on a memory to:

receive a first signal indicating a disaster recovery cluster is about to commence an upgrade;

upon receiving the first signal, determine a total amount of computing resource needed by the disaster recovery cluster to receive migrated entities from a second cluster during the upgrade, wherein to determine the total amount of the computing resource, the processor:

determines a number of the entities of the second cluster to be migrated to the disaster recovery cluster during the upgrade;

identifies which of the number of the entities require a maximum amount of the computing resource;

computes an initial computing resource requirement by aggregating the maximum amount of the computing resource of each of the number of the entities that require the maximum amount of the computing resource; and determines the total amount of the computing resource based on the initial computing resource requirement;

add a first number of compute only nodes to the disaster recovery cluster before the upgrade, wherein to add the first number of the compute only nodes, the processor:

determines an available amount of the computing resource at the disaster recovery cluster;

compares the total amount of the computing resource with the available amount of the computing resource to determine an extra amount of the computing resource needed by the disaster recovery cluster to satisfy the total amount of the computing resource;

determines the available amount of the computing resource at each compute only node; and adds the first number of the compute only nodes to the disaster recovery cluster based upon the available amount of the computing resource at each compute only node to satisfy the extra amount of the computing resource;

receive a second signal indicating the upgrade of the disaster recovery cluster is complete; and remove a second number of the compute only nodes from the disaster recovery cluster upon receiving the second signal, wherein to remove the second number of the compute only node, the processor:

identifies which ones of the first number of compute only nodes added to the disaster recovery cluster are dormant; and removes the dormant ones of the compute only nodes.

12. The system of claim 11, wherein the processor further executes the computer-readable instructions to determine that the compute only nodes are insufficient to satisfy the extra amount of the computing resource.

13. The system of claim 12, wherein the processor executes the computer-readable instructions to add at least one node with storage upon determining that the compute only nodes are insufficient to satisfy the extra amount of the computing resource.

14. The system of claim 11, wherein the processor executes the computer-readable instructions to determine the number of the entities by multiplying a percentage by a total number of the entities in the second cluster.

15. The system of claim 11, wherein the computing resource comprises at least one of memory or central processing unit core resource.

16. The system of claim 11, wherein to identify the dormant ones of the compute only nodes, the processor executes the computer-readable instructions to identify the compute only nodes that are not in use.

17. A non-transitory computer readable media comprising computer-executable instructions embodied thereon that, when executed by a processor, cause the processor to:

receive a first signal indicating a disaster recovery cluster is about to commence an upgrade;

upon receiving the first signal, determine a total amount of computing resource needed by the disaster recovery cluster to receive migrated entities from a second cluster during the upgrade, wherein to determine the total amount of the computing resource, the processor:

determines a number of the entities of the second cluster to be migrated to the disaster recovery cluster during the upgrade;

identifies which of the number of the entities require a maximum amount of the computing resource;

computes an initial computing resource requirement by aggregating the maximum amount of the computing resource of each of the number of the entities that require the maximum amount of the computing resource; and determines the total amount of the computing resource based on the initial computing resource requirement;

add a first number of compute only nodes to the disaster recovery cluster before the upgrade, wherein to add the first number of the compute only nodes, the processor:

determines an available amount of the computing resource at the disaster recovery cluster;

compares the total amount of the computing resource with the available amount of the computing resource to determine an extra amount of the computing resource needed by the disaster recovery cluster to satisfy the total amount of the computing resource;

determines the available amount of the computing resource at each compute only node; and adds the first number of compute only nodes to the disaster recovery cluster based upon the available amount of the computing resource at each compute only node to satisfy the extra amount of the computing resource;

receive a second signal indicating the upgrade of the disaster recovery cluster is complete; and remove a second number of the compute only nodes from the disaster recovery cluster upon receiving the second signal, wherein to remove the second number of the compute only node, the processor:

identifies which ones of the first number of compute only nodes added to the disaster recovery cluster are dormant; and removes the dormant ones of the compute only nodes.

18. The non-transitory computer readable media of claim 17, wherein the processor executes the computer-readable instructions to determine the number of the entities by multiplying a percentage by a total number of the entities in the second cluster.

19. The non-transitory computer readable media of claim 17, wherein the computing resource comprises at least one of memory or central processing unit core resource.

20. The non-transitory computer readable media of claim 17, wherein the processor executes the computer-readable instructions to determine that the compute only nodes are insufficient to satisfy the extra amount of the computing resource and add at least one node with storage upon determining that the compute only nodes are insufficient to satisfy the extra amount of the computing resource.

\* \* \* \* \*